Oct. 10, 1939.  L. S. WILBUR  2,175,497
SAW
Filed March 27, 1937  4 Sheets-Sheet 3
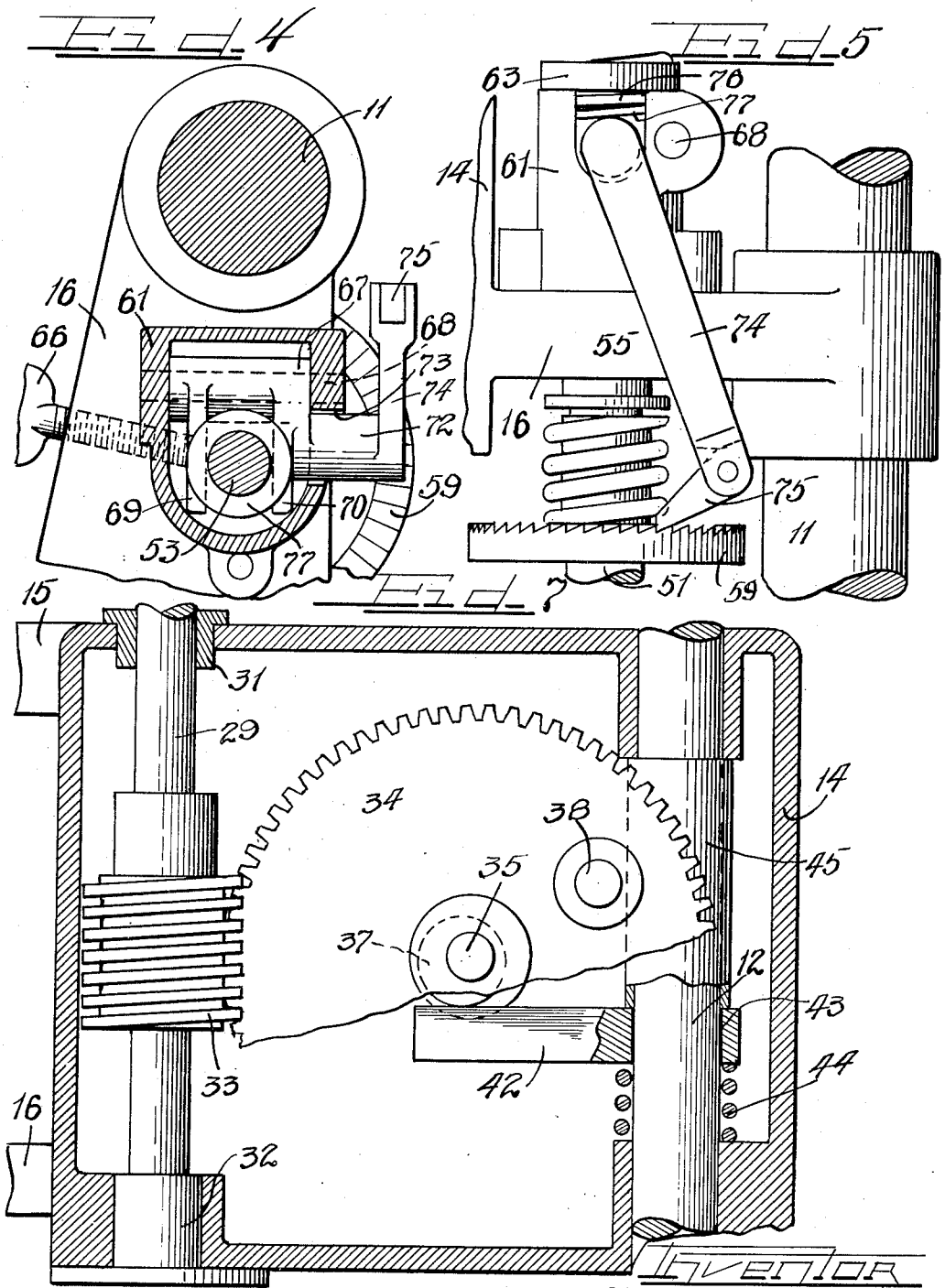
Inventor
Lawrence S. Wilbur
by Charles ... Attys.

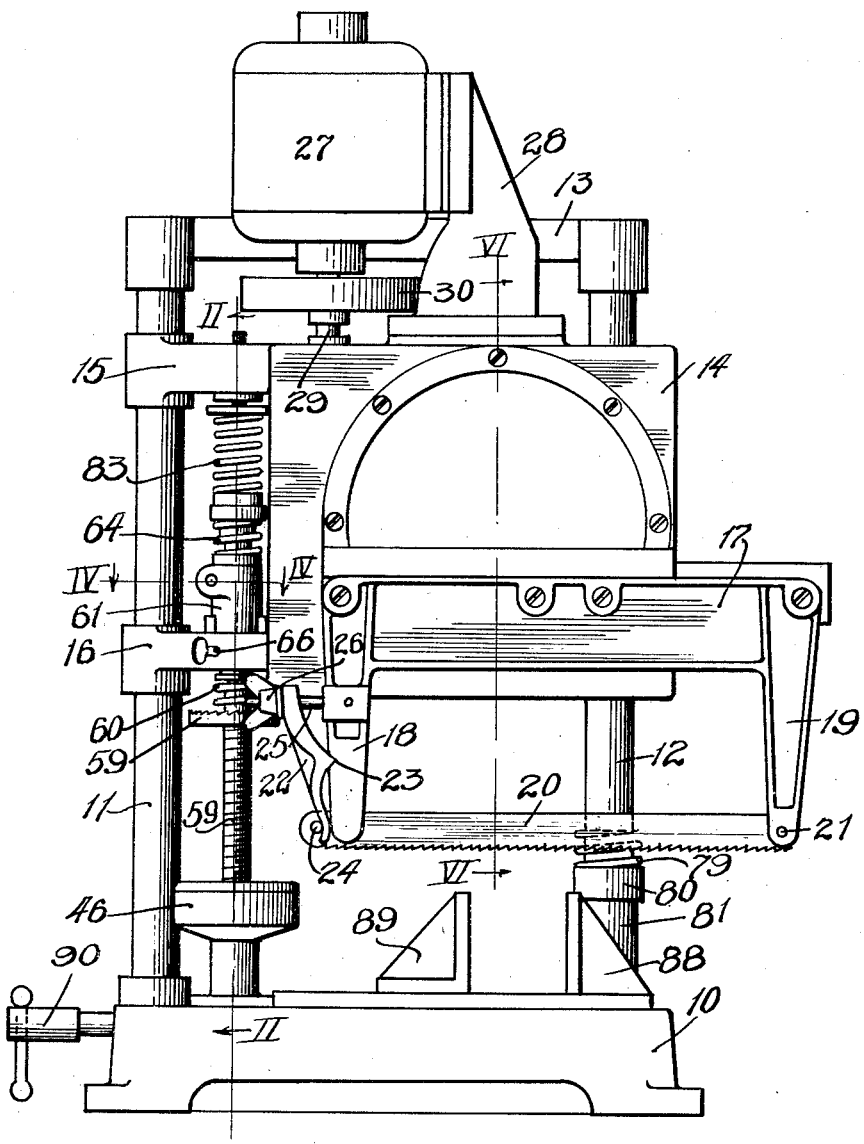

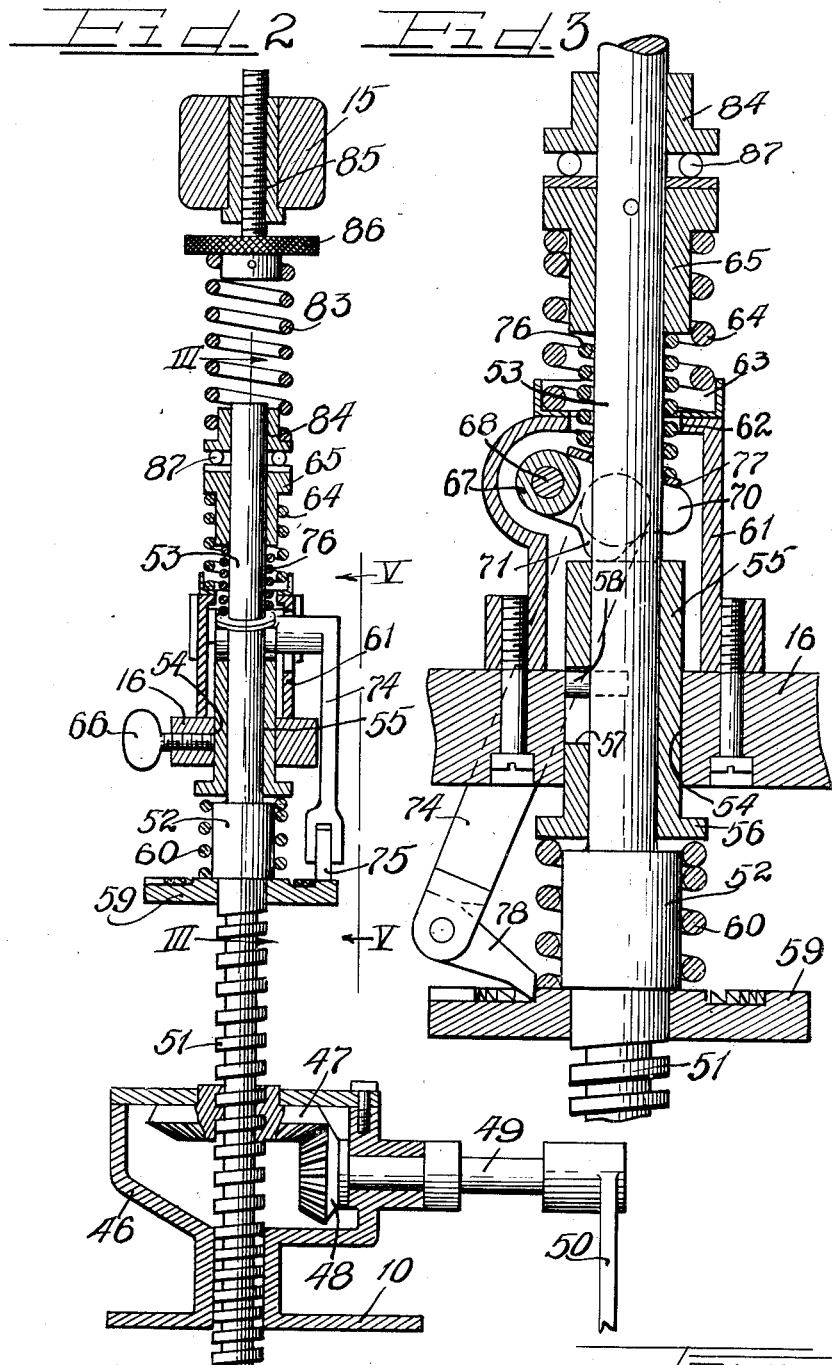

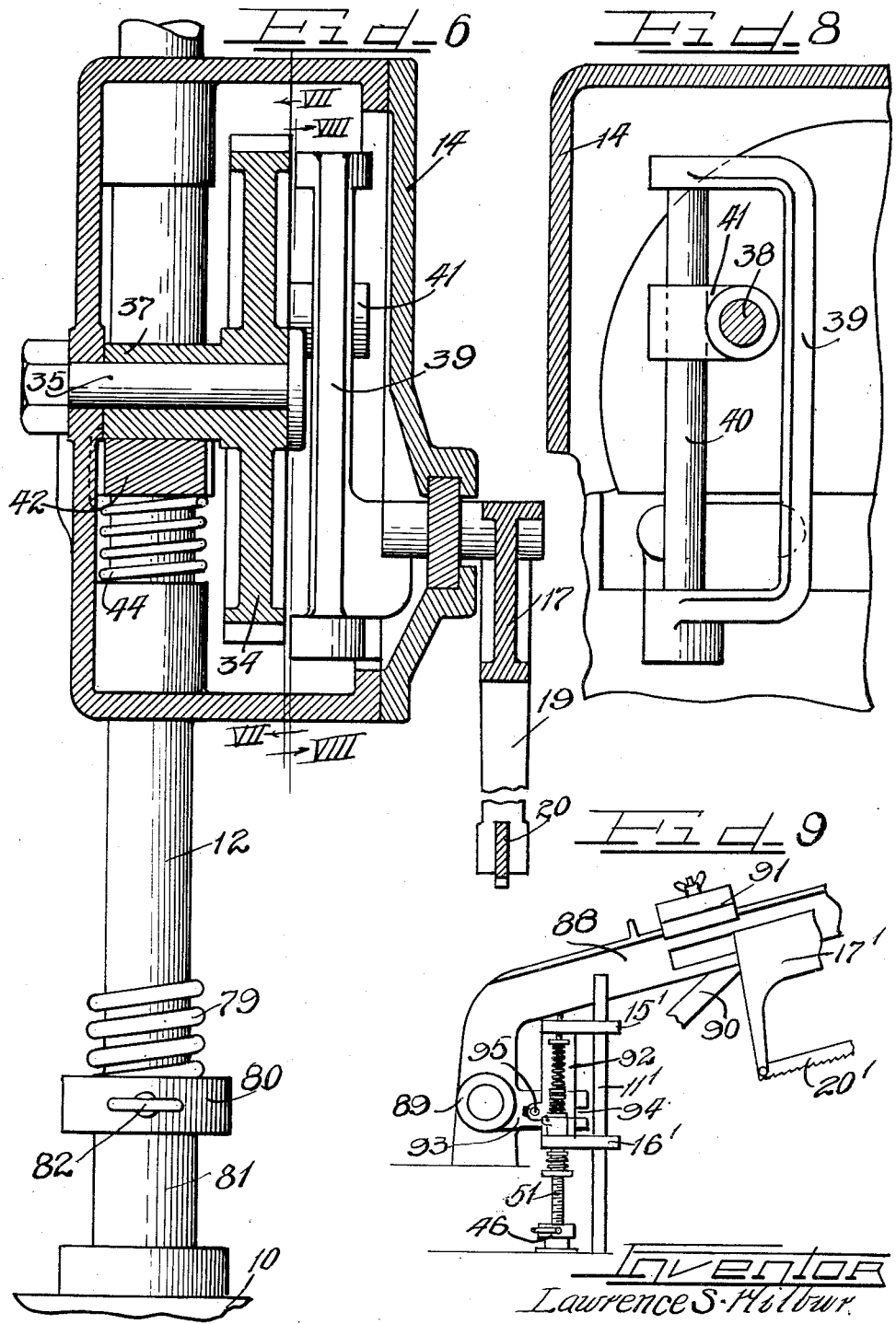

Patented Oct. 10, 1939

2,175,497

UNITED STATES PATENT OFFICE

2,175,497

SAW

Lawrence S. Wilbur, Evanston, Ill., assignor to Mohawk Equipment Corporation, Chicago, Ill., a corporation of Illinois Application March 27, 1937, Serial No. 133,329

21 Claims. (Cl. 29—73)

The present invention relates in general to a saw and improved operating mechanism therefor, and is more particularly concerned with a saw of the type which may be utilized for cutting materials having widely varying characteristics.

For example, in saws heretofore constructed it has been difficult, if not impossible, to properly regulate the cut, pressure on the teeth, etc., in a single device so that it might be used successfully for heavy duty work, such as the sawing of rails, stainless steel, and the like; or, if desired, for light accurate work such as the cutting of thin-walled brass or copper tubing, extremely thin slices or wafers from bar stock, and the like.

The non-adaptability of such saws for such a diversity of work has been largely due to the use of a positive feed mechanism which is arranged to feed a predetermined amount on each cutting stoke of the saw. Adjustment of the proper feed for cutting a particular material is therefore left to the judgment of the operator. Consequently, there is the possibility that the feed adjustment might be set to feed the saw at a rate less than it would be possible for the saw to cut. Under such circumstances, the saw would not be operating at its best efficiency and the cutting speed would be decreased.

On the other hand, there is the possibility that the operator might adjust the feed so that the rate of feed would be greater than the amount that it is possible for the saw to cut on each cutting stroke. Under these circumstances, excessive pressures would be applied to the saw teeth which would be relieved either by the saw becoming stalled, the teeth becoming broken, or the blade being snapped in two.

It is therefore evident that the choice of the proper feed in this type of saw to correspond to the cutting speed which is possible in the material being cut becomes a very difficult problem.

Having in mind the difficulties encountered with the types of saws having a predetermined feed, the present invention contemplates an improved arrangement wherein the feed is not predetermined, but will be whatever the saw may cut on each cutting stroke. In other words, the saw will be cutting most efficiently at all times, and the breaking of saw blades or teeth will be eliminated. Thus, when the saw is cutting a very hard material, the feed will be slow, whereas when the saw is cutting a soft material, the feed will be fast, and the cutting of the material will be at the maximum rate at all times.

This is accomplished by the provision of an operating mechanism which is supported with the saw for vertical raising and lowering movement. The mechanism is so arranged that the entire unit will be raised to take the saw out of the work on the return stroke, and will be freed on the cutting stroke of the saw, so that the entire weight of the unit is utilized to force the blade into the work. Since the unit is free to move into the work on the cutting stroke, it will be apparent that the feed is entirely dependent upon the amount of material that the saw is enabled to cut at each stroke.

It is therefore a primary object of the present invention to provide an improved saw having a simple feeding mechanism which is easy to control and which will function automatically to permit the blade to feed at the same rate as the blade is cutting into the work piece.

A further object of the invention is to provide a saw of the herein described type in which the feed will be fast when the cutting of the material is fast, and slow when the cutting of the material is slow.

It is a further object to provide a feeding mechanism in connection with a saw which will feed the blade towards the material at a fast rate and will automatically slow down the feed, when the cutting of the material starts, to a rate dependent upon the speed with which the material is being cut.

A still further object resides in the provision of improved means for varying the amount of pressure applied to the blade.

Other objects and advantages of the present invention will more fully appear from the following detailed description taken in connection with the accompanying drawings, which illustrate a single embodiment thereof, and in which:

Figure 1 is an elevational view of a machine embodying the features of the present invention.

Figure 2 is an enlarged sectional view showing the details of the feeding mechanism, taken substantially on the line II—II of Figure 1.

Figure 3 is an enlarged fragmentary sectional view through a portion of the feeding mechanism to clearly show certain details thereof, taken substantially on the line III—III of Figure 2.

Figure 4 is an enlarged fragmentary transverse section through the feeding mechanism, taken substantially on the line IV—IV of Figure 1.

Figure 5 is an enlarged face elevation of a portion of the feed mechanism when viewed from the line V—V of Figure 2, and looking in the direction indicated.

Figure 6 is an enlarged transverse section taken through the housing for the operating instrumentalities of the saw blade, taken substantially on the line VI—VI of Figure 1.

Figure 7 is an enlarged longitudinal sectional view of the same taken substantially on the line VII—VII of Figure 6.

Figure 8 is a fragmentary sectional view through a portion of the blade operating mechanism, taken substantially on the line VIII—VIII of Figure 6.

Figure 9 is a fragmentary view in elevation, showing the manner in which the feed mechanism of the herein described invention may be applied to a saw of the type in which the blade is supported on an arm pivoted for swinging movement.

While the invention is susceptible of various modifications and alternative constructions, I have shown in the drawings and will herein describe in detail the preferred embodiment, but it is to be understood that I do not hereby intend to limit the invention to the specific form disclosed, but intend to cover all modifications and alternative constructions falling within the spirit and scope of the invention as expressed in the appended claims.

THE MACHINE IN GENERAL

As shown in Figure 1, the machine comprises a base 10 on which there are mounted a pair of spaced upright guide members 11 and 12, these guide members being secured together at their uppermost ends by means of a yoke 13.

A housing 14 is mounted for sliding up and down movement on the guide members. One end of the housing is mounted directly upon the guide member 12, whereas the other end of the housing is provided with a pair of spaced arms 15 and 16 which extend outwardly, and at their free ends are provided with suitable bearings for receiving the guide member 11.

A saw frame 17 is mounted for reciprocable movement on the forward face of the housing 14. This frame at its ends is provided with depending arms 18 and 19 which form supports for the saw blade 20 which is disposed below the lowermost portion of the housing.

One end of the saw is pivotally secured to the arm 19 by means of a suitable pin 21. The blade engaging end of the arm 18 is slotted to receive the end of the blade, and a blade tightening device is provided in connection with this arm for quickly and easily securing the blade in operative position. This device comprises a rocker member 22 having a knife edge engagement, as shown at 23, with the arm. One end of the rocker member 22 is adapted to engage a pin 24 in the associated end of the saw blade. The other end of the rocker member 22 is associated with a threaded stud 25 and a thumb nut 26, by means of which this end of the rocker arm may be moved in a clockwise direction to tighten the blade in operative position.

*Saw driving mechanism*

The saw is actuated by means of an electric motor 27 which is supported on a bracket 28 at the top of the housing 14, the driving shaft 29 of the motor being disposed in a vertical position and provided with a fly-wheel 30. The driving shaft 29 is carried through the top of the housing in a suitable bearing 31, and the end of this shaft is disposed in a suitable bearing 32 at the bottom of the housing. The drive shaft carries a worm 33 which meshes with and drives a worm gear 34. The worm gear is rotatably mounted on the housing by means of a horizontally disposed transverse stud 35, so that the gear 34 may rotate in a vertical plane.

The hub portion of the gear 34, as shown in Figures 6 and 7, is extended to form a cam portion 37 having its maximum radius disposed substantially in the opposite direction from a crank pin 38.

The saw frame 17 has connected thereto a bracket 39, as shown in Figure 8, this bracket being U-shaped and having its legs connected at their end portions by means of a vertically disposed rod 40. The crank pin 38 is connected to the rod 40 through right angularly disposed bearings which form a link 41.

When the motor 27 is energized, the rotation of its driving shaft is such as to drive the worm 33 in such direction that the worm gear 34 will be rotated in a clockwise direction. Through the connection of the pin 38 with the rod 40, the saw frame will be reciprocably moved. The saw blade is secured in the frame 17 so that when the frame is moved to the left, as viewed in Figure 1, the blade will be on its cutting stroke. During the cutting stroke of the blade, the crank pin 38 will be disposed in the lowermost half of its circular path, and the pin 38 will be disposed near the lowermost end of the bracket 39.

With this arrangement, it will be evident that the greater power of the cutting stroke will be delivered to the saw when the crank pin is near the point of support of the bracket 39, at which time the distance between the crank pin and the point of support of the bracket will be least. On the other hand, when the crank pin is on the upper half of its path of travel and the blade is on its return stroke, the crank pin will be towards the upper end of the bracket 39, this being the period when very little power is required, and during which time the distance between the crank pin and the point of support of the bracket 39 may be greater without subjecting the bracket to abnormal forces.

*Raising and lowering mechanism*

The motor 27, housing 14, frame 17 and blade 20 are arranged to be raised and lowered as a unit on the guides 11 and 12 during the operation of the saw. The raising movement takes place on the return stroke of the saw and the lowering movement takes place on the cutting stroke of the saw. Provision is also made to release the housing relative to the guides during the cutting stroke of the saw, so that the housing with all the attached parts of the driving mechanism may move downwardly freely.

With this arrangement, the inherent weight of the associated parts of the unit is applied to the saw blade, and since there is no restriction to this downward movement the blade will cut the greatest possible amount during the cutting stroke. The amount of this cut, of course, will depend upon the kind of material being worked upon, that is, with a hard material the cut will be less than in the case of a softer material.

The foregoing manner of operation is accomplished by the provision of a plate 42, as shown in Figure 7, one end of this plate being provided with an aperture 43 through which one of the upright guideposts extends. The opposite end of the plate 42 has its upper surface disposed for engagement by the cam 37. Below the opposite end of the plate 42 and surrounding the guide upright 12 is a coil spring 44 having its uppermost end abutting the plate and its lowermost end abutting the bottom of the housing 14. This spring serves to force the plate 42 upwardly and maintain it in engagement with the aforementioned cam. Movement of the plate upwardly from a predetermined position is limited by means of a sleeve 45 on the guide 12, the uppermost end of the sleeve abutting the top of the housing 14, and the lowermost end of this sleeve being in abutting engagement with the apertured end of the plate 42.

The aperture 43 of the plate is of such size that as the cam 37 is rotated and the radial spacing of its cam surface is increased, the end of the plate associated therewith will be moved downwardly to tilt the plate and cause the plate to grippingly engage the guide 12. This gripping action of the plate on the guide takes place a slight interval before the end of the cutting stroke, so that the blade begins to gradually raise as the end of the cutting stroke is reached. Further movement will cause the housing and connected parts to be further raised, reaching a maximum when the crank pin 38 is at the top of its path, and again lower the housing and blade until the beginning of the cutting stroke is reached. At this point of the operation, the blade is further lowered, so as to gradually apply it to the work, and after the cutting stroke has continued for a short interval, the cam will have reached such a position that the spring 44 may again restore the plate 42 to a substantially horizontal position and release it relative to the guide 12. As soon as the plate 42 is released relative to the guide, the saw, housing and driving mechanism are free to move downwardly and apply their inherent weight as a pressure to force the blade into the work.

It will therefore be seen that with this arrangement the force is applied to the cutting blade gradually at the beginning of its cutting stroke, thus obviating the danger of breaking the blade or teeth. The amount of feed will depend upon the amount which the blade cuts during its cutting stroke.

*Hand feed mechanism*

From the above, it will be evident that as long as the saw continues to operate, the saw blade will continue to cut into the material which is being worked upon. Oftentimes, it is desirable to terminate the cut before the material has been entirely cut through, as where it is desired to cut into the material a predetermined amount. In order to control and stop the cutting operation at the desired point, a novel hand feed arrangement is provided.

For this purpose, a screw jack arrangement is mounted on the base 10 of the machine. This jack comprises a housing 46 within which there are mounted meshed bevel gears 47 and 48 in right angular relationship. The gear 48 is mounted on a horizontally disposed shaft 49 which projects to the exterior of the housing and is fitted with a suitable crank 50, by means of which the jack may be manually operated. The gear 47 has its hub threaded to mesh with a vertically disposed screw 51 which may be raised and lowered by manipulation of the crank 50.

At the uppermost end of the screw portion, the material is enlarged to define an enlarged smooth abutment section 52, and then is contracted to form a smooth extension 53 which extends through an aperture 54 formed in the arm 16 of the housing. Slidably mounted in the aperture 54 and surrounding the extension 53 is a sleeve 55 which is provided at its lowermost end with an outwardly extending flange 56. The sleeve 55 is provided with a longitudinally extending slot 57 within which one end of a pin 58 carried by the extension 53 is disposed for limited movement.

Secured to the upper end of the screw portion 51 and abutting the lowermost end of the enlarged portion 52 is an indexing wheel 59. An expansion spring 60 surrounds the enlarged portion 52 and has its lowermost end in abutment with the index wheel and its uppermost end in abutment with the flanged end 56 of the sleeve 55. This spring is made of such overall length as to normally maintain the flanged end of the sleeve 55 at a position slightly raised from the shoulder at the upper end of the enlarged portion 52.

On the upper surface of the arm 16 and surrounding the upper end of the sleeve 55 and the extension 53, a housing 61 is provided, the upper end of this housing being apertured, as shown at 62, to permit the extension 53 to pass therethrough. A cup-shaped member 63 is secured to the upper end of the housing 61 and forms a seat for one end of an expansion spring 64. The other end of this spring abuts a collar 65 which is secured to the extension 53.

A set screw 66 is mounted in the arm 16 and arranged so that when it is screwed inwardly it will engage the sleeve 55 and secure it for unitary movement with the arm 16. When the screw 66 is released, this sleeve is free to move relative to the arm 16. The screw 66 is fastened against the sleeve 55 when it is desired to feed the saw by hand, and the screw 66 is screwed outwardly to release the sleeve when it is desired to feed the saw automatically, as will be described subsequently.

For hand feeding of the saw, the operator manipulates crank 50 to actuate the bevel gear 47 and nut associated therewith in such a direction as to raise or lower the screw 51, as desired. As previously explained, when the saw is fed by hand, the screw 66 is screwed inwardly so as to tightly engage the sleeve 55. Assuming that it is desired to lower the saw towards the work, the jack will be actuated so that the screw moves downwardly. This movement of the screw will compress the spring 64 and release the spring 60 as the enlarged portion 52 at its uppermost end, as shown in Figure 3, is moved away from the flanged end 56 of the sleeve. Pressure will therefore be resiliently applied to the frame and tend to force it downwardly to carry the saw blade into the work.

If it is desired to raise the blade relative to the work, this is accomplished by rotating the handle of the jack in the opposite direction so that the action of the nut on the bevel gear 47 will raise the screw. The action of the springs 64 and 60 will now be reversed from that just described in lowering the blade, the spring 64 being decompressed and the spring 60 compressed until the flange 56 abuts the upper end of the enlarged portion 52, whereupon the frame will be moved upwardly. It will be observed that due to the initial compression of the spring 60 before the flange 56 has engaged the upper end of the enlarged portion 52, the pressure will be resiliently applied to the frame.

The resilient abutment provided by the springs 60 and 64 also serves as a safety feature. For example, if the saw is not running and an attempt is made to lower the saw when the plate 42 is in such position as to grippingly engage the guide member 12, it would be impossible to lower the saw, and there is a possibility that damage to the jack or other portion of the mechanism might result by the application of such an excessive force to the parts. With the above described arrangement, however, this force is cushioned by the action of the spring 64 which resiliently absorbs the forces emanating from the jack equipment. Under such circumstances, it would be necessary to start up the saw and then feed the blade downwardly by proper manipulation of the jack as described above.

*Automatic feed mechanism*

Since the amount of feed of the saw depends upon the amount of cut during each stroke of the saw blade which permits the sawing mechanism to move downwardly on the guide members 11 and 12, it will be appreciated that when the feed is to be automatic rather than by hand, it will be necessary to lower the jack screw in order not to interfere with the normal feed of the saw blade.

Automatic feed is accomplished by means of an indexing arrangement for automatically turning the index wheel 59 in the proper direction so as to advance or index the jack in a downward direction during the sawing operation.

Mounted within the housing 61 is a U-shaped member 67, as shown in Figure 4, this member being pivoted for rotational movement on a pivot pin 68. Arms 69 and 70 of this member straddle the extension 53 of the jack and are arranged with projections 71 on their lowermost edges for engaging the upper end of the sleeve 55, as shown in Figure 3.

One of the arms, in this instance the arm 70, is provided with an integrally formed lateral extension 72 which projects through an aperture 73 formed in the housing 61. The outer end of this extension is deflected and formed into an arm 74. At the outermost end of this arm, there is pivotally mounted a pawl 75 which will ride over the teeth of the index wheel 59, when the arm 74 is swung in a counter-clockwise direction, but will drop down and engage the teeth to move the index wheel, when the arm 74 is moved in a clockwise direction.

Disposed within the spring 64 and surrounding the extension 53 is a coil spring 76. The uppermost end of this spring bears against the collar 65, and the lowermost end abuts a washer 77 which is disposed around the extension 53 and engages the arms 69 and 70 of the U-shaped member 67. The action of this spring is to normally force the arm 74 to move in a counter-clockwise direction.

Advantage is taken of the raising and lowering movements of the arm 16 during the sawing operation to actuate the indexing mechanism. Assuming now that it is desired to permit the saw to automatically feed into the work, the screw 66 is unscrewed to release the sleeve 55 relative to the arm 16.

As shown in Figure 3, the jack operating parts are in the position which they occupy when the housing 14 is in raised position, that is, when the saw blade has reached the top of its return stroke and is ready to start lowering to the beginning of its cutting stroke. In this position, the spring 64 has been raised until its ends are respectively in engagement with the collar 65 and cup 63. This spring, however, is not compressed to any extent. Likewise, the spring 60 is not compressed, but has assumed its normal length and is therefore unenergized.

The pin 58 is at the top end of the slot 57, and the arm 74 is at the extremity of its movement in a counter-clockwise direction, as shown in Figure 5.

As the operation of the saw is continued, the cooperative action of the cam 37 on the plate 42 is such as to lower the frame 14 and thus bring the saw blade into the work. During this operation, the arm 16 likewise moves downwardly, carrying with it the housing 61 and pivotal mounting of the U-shaped member 67. The frame 14 will have movement relative to the sleeve 55 which is resiliently supported by the jack mechanism.

As the arm 16 moves downwardly, engagement of the projections 71 with the uppermost end of the sleeve will tend to rotate the U-shaped member upwardly against the pressure of the spring 76. This action causes the arm 74 to move in a clockwise direction, as viewed in Figure 5. Since the movement of this arm in this direction causes the pawl 75 to engage the teeth on the index wheel, the index wheel will be rotated to move the screw in the bevel gear nut and lower the screw to advance it as the cutting operation of the blade continues, so that the downward movement of the jack prevents it from interfering with the downward movement of the saw as it cuts into the material.

With the arrangement just described, it will be apparent that when the saw is started up and the blade has not yet reached the work piece, the blade will be fed downwardly to the work very rapidly. As soon as the saw engages the work piece, the feed will be slowed up, depending upon the rate of cutting of the work piece. That is, several cuts may be necessary before the arm 74 is actuated to move the index wheel to lower the jack screw.

*Depth of cut control*

With the saw connected for automatic feed, the blade will continue to cut through the work piece. It is, of course, desirable to stop the further cutting of the saw when it has passed through the work piece, or when the sawing mechanism has been lowered to a predetermined amount on the guides 11 and 12. Limitation of this downward movement is accomplished by means of a coil spring 79 which is supported on a ring member 80 which is slidably mounted on the guide member 12. The ring 80 is supported on a sleeve 81 having its lower end abutting a boss on the base 10. A thumb screw 82 is threaded into the ring 80, so that by tightening the screw the ring 80 may be raised and lowered and supported in any adjusted position on the guide member. This arrangement forms a resilient stop for limiting downward movement of the saw at any point desired.

Since the saw, housing, motor and connected equipment forming the mechanism can move downwardly with a free movement and apply the entire weight of these parts to the saw blade on its cutting stroke, it has been found to be desirable to be able to adjust the amount of pressure to less than that resulting from the full weight of these parts, when cutting certain types of materials. For example, with certain types of materials, it may be desirable to apply the full weight of substantially ninety pounds to the saw blade, whereas, for some other materials, it may be desirable to decrease this value to twenty or thirty pounds, or even to a value which is substantially zero.

In order to take care of this condition, an expansion spring 83, as shown in Figure 2, is provided. The lowermost end of this spring is in engagement with a collar 84 which is rotatably mounted on the end of the extension 53. The uppermost end of this spring engages an adjustable screw stud 85 in threaded engagement with the arm 15 of the housing. This stud is provided with a knurled head portion 86 so that the action of the spring may be easily adjusted. Since this spring is acting to oppose downward movement of the frame, the stress of the spring is preferably taken on a ball thrust bearing which is provided for by inserting balls 87 between the collars 65 and 84. These balls are held in operative position by means of a suitable retainer.

From the above description, it will be apparent that by increasing or decreasing the opposing force of the spring 83 by manipulating the screw 85, the downward pressure of the saw blade due to the machine parts may be opposed in any desired amount. By making this spring suitably heavy, it is possible to entirely counteract the downwardly acting forces against the blade, if desired. Naturally, if less pressure is applied to the blade, the amount of feed of the blade during each cutting stroke will be decreased and consequently its rate of feed decreased.

Work holding means

For clampingly engaging and holding the work upon which the saw is to be used, a suitable vice is built into the base 10. The vice in this instance comprises a stationary jaw 88 and a movable jaw 89 which is connected through a suitable screw in the customary manner. This screw is brought out to an operating handle 90 at the side of the base. By manipulating the handle 90, the jaw 89 may be moved towards or away from the stationary jaw 88.

Summary of operation

When it is desired to cut a given piece of material the work piece is clamped between the jaws of the vice and the motor started up. As soon as the motor starts its operation, the cam 37 and plate 42 cooperate to alternately raise and lower the housing, motor and saw supporting structure as a unit.

The spring 83 is then adjusted to obtain the desired amount of pressure on the blade during its cutting stroke, depending upon the type of material being cut.

Assuming that it is desired to control the feed of the saw blade by hand, the screw 66 is tightened to clamp the sleeve 55 against movement relative to the arm 16. The saw blade may then be moved towards or away from the work at any desired rate by manipulating the crank 50 of the jacking mechanism. Of course, when the feed is being manually controlled, the cutting operation may be terminated at any desired point or time.

In case the feed is to be automatic, the spring 83 would be adjusted as previously, and the screw 66 would be unscrewed to release the sleeve 55. With the saw blade out of engagement with the work when the motor is started, the saw blade will be fed downwardly at a fast rate, due to the action of the pawl actuating mechanism on the indexing wheel 59. As soon, however, as the blade engages the work, the amount of feed during each cutting stroke of the saw blade will be determined by the type of material being cut. The feed will automatically be slowed down during the cutting operation.

The termination of the cutting operation may be accomplished by stopping the motor or by so adjusting the position of the spring 79 on the guide 12 that the feeding movement will be stopped at the proper point.

Change from manual to automatic feed control may be made at any time during the sawing operation simply by manipulation of the screw 66 so as to engage or disengage the sleeve 55.

Additional applications

In the present application, the preferred feed arrangement has been applied to a machine of the type wherein the blade is reciprocated horizontally, and the blade feed is likewise in a vertical direction. That is, the blade is vertically fed during the cutting operation.

It will be apparent to one skilled in the art that the present invention may with equal facility be applied to machines wherein the blade does not feed vertically, as, for example in a machine of the type wherein the blade frame is pivoted so as to move in a curved path. Such an application is shown in Figure 9. In the arrangement therein illustrated, the saw blade 20' is supported on a frame 17', this frame being reciprocably mounted on a main frame member 88. The main frame is pivoted, as shown at 89, for swinging movement, whereby the saw blade may be moved in a curved path towards or away from the work.

The frame 17' is reciprocably moved through a link 90 which is connected to any suitable operating mechanism (not shown). This operating mechanism also is so arranged and connected to the frame 88 as to alternately raise and lower the saw blade on its return and cutting strokes. In the arrangement shown, a weight 91 may be moved along the main frame 88 to apply greater or less pressure to the blade.

As in the preferred arrangement, a guide 11' is provided, and arms 15' and 16' which are slidable on this guide. The arms are interconnected by a member 92 in the same manner as the arms 15 and 16 are connected by the housing 14.

In order that the raising and lowering movements of the frame 88 may be transmitted to the feeding mechanism, the main frame 88 is provided with an additional arm 93 which is provided with a longitudinally extending slot 94. This slot has disposed therein a suitable pin 95 which is carried by the member 92. The operation of the feeding device when mounted on a saw of this type will be the same as in the preferred application.

From the foregoing description, it will be apparent that the present invention provides a saw having improved feeding mechanism for enabling the sawing of heavy duty materials, such as rails, stainless steel, and the like, or which may also be used for light accurate work, for cutting of thin-walled brass or copper tubing, etc.; a feeding mechanism which is simple in construction and does away with predetermined feed; in which the saw feed is dependent only upon the speed at which the work material may be cut; in which the cutting of a specific material will be accomplished at the most efficient cutting speed; a saw in which the cutting of the material will proceed at a fast rate when the cutting of the material is fast and at a slow rate when the cutting of the material is slow; in which the feed will be at a fast rate until the blade engages the material, whereupon the feed slows down in accordance with the cutting speed of the material; and which includes improved means for varying the pressure applied to the blade.

I claim as my invention:

1. In a power saw, a frame supported for vertical raising and lowering movements, a saw blade operatively supported on the frame, means for raising and lowering the blade and frame as a unit on the return and cutting strokes of the blade, means actuated by the lowering movement of the frame for releasing said unit for free lowering movement during the cutting stroke of the blade, whereby the weight of said frame is utilized to force the blade into the work, and means to limit the extent of said free movement to predetermined limits.

2. In a power saw, a frame supported for vertical raising and lowering movements, a saw blade operatively supported on the frame, means for raising and lowering the blade and frame as a unit on the return and cutting strokes of the blade, means for releasing said unit for free lowering movement during the cutting stroke of the blade, whereby the weight of said frame is utilized to force the blade into the work, and spring abutment means for resiliently limiting the extent of said free movement.

3. A power saw including a reciprocable saw blade free for feeding movement towards the work on its cutting stroke, means for applying a pressure for forcibly moving the blade into the work during the cutting stroke, stop means for terminating the feeding movement of the blade when a predetermined feeding movement is exceeded, and means for automatically feeding the stop means in the direction of the blade feed for maintaining the stop means ahead of the feeding movement, whereby the stop means is rendered ineffective.

4. A power saw including a reciprocable saw blade free for feeding movement towards the work on its cutting stroke, means for applying a pressure for forcibly moving the blade into the work during the cutting stroke, stop means for terminating the feeding movement of the blade when a predetermined feeding movement is exceeded, and means responsive to the feeding movement of said blade for advancing the stop means to keep it ahead of the feeding movement.

5. A power saw including a reciprocable saw blade free for feeding movement on its cutting stroke, means for applying pressure to the blade during the cutting stroke to force it into the work, stop means for terminating free movement of the blade in a feeding direction, and means for moving said stop means in the feed direction of the blade at a relatively fast rate when the cutting rate of the blade is fast, and at a relatively slow rate when the cutting rate of the blade is slow, whereby the stop means is rendered ineffective during normal feeding movements of the blade.

6. A power saw including a reciprocable saw blade free for feeding movement on its cutting stroke, means for applying pressure to the blade during the cutting stroke to force it into the work, stop means for terminating free movement of the blade in a feeding direction, and means for advancing the stop means ahead of the blade as the cutting progresses at a variable rate depending upon whether the material being cut is relatively hard or soft, whereby the stop means is normally maintained ineffective.

7. A power saw including a reciprocable saw blade free for feeding movement on its cutting stroke, means for applying pressure to the blade during the cutting stroke to force it into the work, stop means for terminating free movement of the blade in a feeding direction, and means for advancing the stop means ahead of the blade movement in accordance with the speed of cutting.

8. In a power saw, a saw blade movable into the work during the cutting operation, stop means for terminating said movement, and means for indexing said stop in accordance with the speed of cutting to keep it ahead of the blade movement, whereby under normal operation said stop is rendered ineffective.

9. In a power saw, a frame, a saw blade mounted for reciprocable movement on the frame, means for moving said frame to carry the blade into the work, a stop member disposed in the path of movement of said frame, and means carried by said frame for moving the stop member in accordance with the movement of said blade into the work to maintain the stop means spaced from said frame.

10. In a power saw, an upright guide member, a frame mounted for raising and lowering movement on said guide, a saw mounted on the frame for reciprocable movement, means for simultaneously reciprocating the blade and alternately raising and lowering the frame and blade as a unit on the return and cutting strokes respectively of the blade, said frame and blade being released for free movement on the guide during a portion of the cutting stroke of the blade, an upright screw supported for raising and lowering movements, abutment means carried by said screw disposed in the path of movement of said frame, and adapted to be engaged by the frame, a ratchet wheel rigidly mounted on said screw, and pawl means actuated in response to the raising and lowering movements of said frame for actuating the ratchet wheel in a direction to lower the screw and move the abutment means downwardly as the blade moves into the work, whereby said abutment is maintained out of engagement with the frame.

11. In a power saw, an upright guide member, a frame mounted for raising and lowering movement on said guide, a saw mounted on the frame for reciprocable movement, means for simultaneously reciprocating the blade and alternately raising and lowering the frame and blade as a unit on the return and cutting strokes respectively of the blade, said frame and blade being released for free movement on the guide during a portion of the cutting stroke of the blade, an upright screw supported for raising and lowering movements, resilient abutment means carried by said screw disposed in the path of movement of said frame, a ratchet wheel rigidly mounted on said screw, and pawl means actuated in response to the raising and lowering movements of said frame for actuating the ratchet wheel in a direction to lower the screw and move the abutment means downwardly as the blade moves into the work.

12. A power saw comprising a frame supported for raising and lowering movements, means for guiding said frame in said movements, a reciprocable saw blade carried by said frame, means for driving said saw, means for raising and lowering said frame in accordance with the return and cutting strokes of said blade, a projection on said frame, a pair of fixedly spaced abutment members disposed on either side of said projection and supported independently of said frame, an element operable to raise and lower said abutment members, and means operable in response to the raising and lowering movements of said frame for actuating said element to lower the abutment members.

13. A power saw comprising a frame supported for raising and lowering movements, means for guiding said frame in said movements, a reciprocable saw blade carried by said frame, means for driving said saw, means for raising and lowering said frame in accordance with the return and cutting strokes of said blade, a projection on said frame, a pair of fixedly spaced abutment members disposed on either side of said projection and supported independently of said frame, an element operable to raise and lower said abutment members, means operable in response to the raising and lowering movements of said frame for actuating said element to lower the abutment members, means for rendering said latter means inoperative to actuate said element, and means for independently actuating said element to selectively raise and lower said abutment members.

14. A power saw comprising a frame supported for raising and lowering movements, means for guiding said frame in said movements, a reciprocable saw blade carried by said frame, means for driving said saw, means for raising and lowering said frame in accordance with the return and cutting strokes of said blade, a projection on said frame, a pair of fixedly spaced abutment members disposed on either side of said projection and supported independently of said frame, a screw operable to raise and lower said abutment members, means operable in response to the raising and lowering movements of said frame for actuating said screw to lower the abutment members, means for rendering said latter means inoperative to actuate said screw, and means for independently actuating said screw to selectively raise and lower said abutment members.

15. In a power saw comprising a frame pivoted for swinging movement, a saw blade reciprocably mounted on said frame, means for pivoting said frame and blade as a unit in alternate directions of movement and advancing them in a direction to feed the saw into the work, jacking means for terminating said feeding movement, and means for actuating said jacking means at a rate determined by the rate of feeding movement to maintain the jack ineffective to terminate the feeding movement during normal operation but enable the jack to terminate the feeding movement when the rate of feeding movement is greater than the rate of movement of the jack.

16. In a power saw comprising a frame, a saw blade reciprocably mounted on said frame, means for moving said frame and blade in alternate raising and lowering movements and advancing them in a direction to feed the saw into the work, jacking means adapted upon being engaged by the frame to terminate said feeding movement, and means for actuating said jacking means at a rate determined by the rate of feeding movement, whereby the jacking means is normally maintained out of engagement with the frame.

17. In a saw of the character described, a stationary upright guide member, a frame arranged for raising and lowering movements on said guide member, a reciprocable saw blade carried by said frame, means including a crank rotatably mounted on the frame for driving said blade, a cam member rotatable with said crank, a plate member apertured at one end for receiving said guide, the other end of said plate being disposed to bear against said cam member, a stop member associated with the frame and arranged to abut the apertured end of said plate on the same side as the cam is disposed, and spring means tending to move the plate in the direction of the cam and stop, said cam operating to cause the plate to alternately grip and ungrip the guide and raise and lower the frame and blade as a unit.

18. A power saw comprising a frame, a saw blade mounted on said frame for reciprocable movements, means for moving said frame in alternate raising and lowering movements and advancing it in a direction to feed the saw into the work, a screw member having one end adapted to engage said frame, a rotatably mounted nut on said member, means for rotating the screw in said nut to lower the screw member, and means for rotating the nut to raise and lower the screw member.

19. A power saw comprising a frame, a saw blade mounted on said frame for reciprocable movements, means for moving said frame in alternate raising and lowering movements and advancing it in a directon to feed the saw into the work, a screw member having one end adapted to engage said frame, a rotatably mounted nut on said member, means for rotating the screw in said nut to lower the screw member, means for rotating the nut to raise and lower the screw member, and means for rendering inactive the means for rotating the screw member.

20. In a saw, a stationary guide member, a frame mounted for raising and lowering movement on said guide member, a blade reciprocably carried by said frame, power means for driving the saw, an elongate plate having an opening between its ends for receiving the guide therethrough, spring means surrounding the guide for normally maintaining said plate horizontal for free sliding movement on the guide, a cam acting directly on one end of the plate to tilt it to a position gripping the guide, whereby the plate provides a fixed support enabling the cam to raise and lower the frame, and means responsive to lowering movement of the frame for restoring the plate to horizontal position ungripped relative to the guide.

21. In a saw, a stationary guide member, a frame mounted for raising and lowering movement on said guide member, a blade reciprocably carried by said frame, power means for driving the saw, an elongate plate having an opening between its ends for receiving the guide therethrough, a compressed spring slidably surrounding said guide for normally maintaining said plate horizontal for free sliding movement on the guide, a cam acting directly on one end of the plate to tilt it to a position gripping the guide, whereby the plate provides a fixed support enabling the cam to raise and lower the frame, and means carried by said frame arranged to engage the other end of the plate, when the frame is lowered, to restore the plate to horizontal position released relative to said guide.

LAWRENCE S. WILBUR.